(12) United States Patent
Briesch

(10) Patent No.: US 7,367,177 B2
(45) Date of Patent: May 6, 2008

(54) COMBINED CYCLE POWER PLANT WITH AUXILIARY AIR-COOLED CONDENSER

(75) Inventor: Michael S. Briesch, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 547 days.

(21) Appl. No.: 11/012,953

(22) Filed: Dec. 14, 2004

(65) Prior Publication Data

US 2006/0123767 A1    Jun. 15, 2006

(51) Int. Cl.
F02C 6/00 (2006.01)
F02G 1/00 (2006.01)
F02G 3/00 (2006.01)

(52) U.S. Cl. .................... 60/39.182; 165/110
(58) Field of Classification Search ............. 60/39.182, 60/39.5, 39.511; 165/110
See application file for complete search history.

(56) References Cited

U.S. PATENT DOCUMENTS

| 4,282,708 A * | 8/1981 | Kuribayashi et al. ......... 60/778 |
| 5,095,706 A * | 3/1992 | Saito et al. .................... 60/646 |
| 5,189,873 A * | 3/1993 | Mishima et al. ......... 60/39.182 |
| 6,012,290 A | 1/2000 | Garcia |
| 6,038,851 A * | 3/2000 | Shiba ...................... 60/39.182 |
| 6,141,952 A * | 11/2000 | Bachmann et al. ........... 60/772 |
| 6,145,295 A | 11/2000 | Donovan et al. |
| 6,244,035 B1 * | 6/2001 | Krill ........................... 60/783 |
| 6,293,104 B1 * | 9/2001 | Kangai et al. ................ 60/645 |
| 6,481,208 B1 | 11/2002 | Nadig |
| 6,604,354 B2 | 8/2003 | Oto et al. |
| 6,966,171 B2 * | 11/2005 | Uematsu et al. ......... 60/39.182 |
| 7,107,774 B2 * | 9/2006 | Radovich ..................... 60/778 |
| 2004/0045300 A1 | 3/2004 | Dovali-Solis |

FOREIGN PATENT DOCUMENTS

| DE | 195 07 167 C1 | 5/1996 |
| DE | 195 06 757 A1 | 8/1996 |
| GB | 1 259 230 | 1/1972 |
| WO | WO 96/38656 A1 | 12/1996 |

* cited by examiner

Primary Examiner—William H. Rodríguez

(57) ABSTRACT

A combined cycle power plant (20) including a main air-cooled condenser (22) condensing steam at a first pressure and an auxiliary air-cooled condenser (24) condensing steam at a second pressure higher than the first pressure. Designing an air-cooled combined cycle power plant for startup on a hot day can significantly increase the size and cost of the required air-cooled condenser. Adding an auxiliary air-cooled condenser having appropriate thermal characteristics relative to a main air cooled compressor to the steam bypass circuit of an air-cooled combined cycle power plant enables the plant to meet plant startup requirements during periods of peak thermal load in a more cost effective manner than would be achievable with the main air cooled condenser alone.

8 Claims, 2 Drawing Sheets

COMBINED CYCLE POWER PLANT WITH AUXILIARY AIR-COOLED CONDENSER

FIELD OF THE INVENTION

The present invention is generally related to the field of power generation, such as a combined cycle power plant, and, more particularly, to air-cooled condensing apparatus for a combined cycle power plant.

BACKGROUND OF THE INVENTION

Combined cycle power plants are well known in the art. A combined cycle power plant includes both a gas turbine-based topping cycle and a steam turbine or a steam rankine bottoming cycle that is driven by heat in the exhaust of the gas turbine engine. U.S. Pat. No. 6,145,295, assigned in common to the assignee of the present invention, describes one exemplary combined cycle power plant.

FIG. 1 is a simplified schematic of an exemplary combined cycle power plant 10 that may benefit from aspects of the present invention. Heat contained in an expanded working medium (e.g., flue gas) from at least one gas turbine (GT) 11 is utilized to generate steam for one or more steam turbines (e.g., steam turbines 12 and 14). The heat transfer is effected in a heat-recovery steam generator (HRSG) 16, which is connected downstream of the gas turbine on the flue-gas side and in which heating areas are disposed in the form of tubes or banks of tubes. The latter in turn are connected by way of a water/steam circuit to the steam turbines. The water/steam circuit may include a plurality of pressure stages, for example three pressure stages.

The steam generated in the heat-recovery steam generator 16 is fed to the steam turbines 12 and 14, where it expands to perform work. The steam turbines may include a number of pressure stages, which are adapted in their number and layout to the structure of the heat-recovery steam generator. The steam expanded in the steam turbines may be fed to an air-cooled condenser (ACC) 18 to be condensed therein. The size and cost of the ACC 18 is not insignificant considering that the size of such a condensing device may be as large as a football field. The condensate resulting during the condensation of the steam is returned as feedwater to the heat-recovery steam generator 16 so that a closed water/steam circuit is obtained.

For air-cooled combined cycle power plants, such as may be deployed in relatively dry geographical regions where water is a scarce resource, one of the most severe sizing constraints for the ACC arises due to the requirement of being able to perform a plant startup or restart during a period of peak thermal load, such as on a hot day. Typically, during plant startup, gas turbine load is ramped upward with essentially all steam production from the heat recovery steam generator bypassing the steam turbines 12 and 14 to the ACC 18. Because there is no energy removed from the steam by the steam turbine during bypass operation, the heat duty imposed on the ACC 18 is relatively high, resulting in relatively higher steam turbine exhaust pressure. As gas turbine load and the resulting heat duty to the condenser increase, so does the steam turbine exhaust pressure. In order to bring the steam turbine on line, however, steam turbine exhaust pressure should be maintained at a relatively low value to avoid exceeding steam turbine design limits during the startup process.

Plant startup on a hot day aggravates the situation further because high ambient temperatures lead to even higher steam turbine exhaust pressures, as the ACC performance depends significantly on the temperature difference ($T_{saturated}-T_{ambient}$). Hence, it is even more difficult on hot days to maintain the steam turbine exhaust pressure below the maximum allowable value for rolling the steam turbine.

Other factors in today's power generation market play a roll in defining requirements for plant startup. For instance, plant operators generally place greater emphasis on reducing plant startup time and overall plant emissions. This results in a need to quickly ramp the gas turbines to relatively high load levels prior to rolling the steam turbine, which makes maintaining low steam turbine back pressure prior to rolling the steam turbine very difficult.

One conceptually possible approach for meeting these peak heat transfer requirements for plant startup or restart on a hot day is to increase the size of the ACC 18. In a practical implementation, such an approach would significantly increase the size and cost of the ACC without a corresponding improvement in base load plant performance and, as a result, the overall combined cycle power plant would be less cost effective. Accordingly, it is desirable to provide an improved air-cooled plant and condensing apparatus that can accommodate the various operating criteria for plant startup or restart during a period of peak thermal load while achieving a reduction in the cost of the overall air-cooled power plant.

BRIEF DESCRIPTION OF THE DRAWINGS

These and other advantages of the invention will be more apparent from the following description in view of the drawings that show.

DETAILED DESCRIPTION OF THE INVENTION

The inventors of the present invention have recognized innovative and cost-effective techniques for providing an improved combined cycle pow of the present invention allow accommodating various operating criteria for plant startup or restart during a period of peak thermal load, such as during a hot day, while achieving a reduction in cost of the overall combined cycle power plant.

In one exemplary embodiment, the heat rejection capability of a main ACC 22 is supplemented by an auxiliary condenser 24, such as an air-cooled steam dump condenser that can be used during plant startup and steam bypass operation to supplement the heat rejection capability of the ACC 22, thereby reducing steam turbine back pressure.

In one exemplary embodiment, the auxiliary condenser 24 is selected to have different thermal characteristics relative to ACC 22. More particularly, auxiliary condenser 24 is configured to operate at a higher pressure (e.g., higher outlet pressure) relative to ACC 22. For example, in one exemplary embodiment ACC 22 operates below atmospheric pressure, and, in this case, auxiliary condenser 24 may be designed to operate at one atmospheric pressure or greater. One exemplary range of operating pressure for ACC 22 may be from approximately 0.5 psia to approximately 5.0 psia. For auxiliary condenser 24, one exemplary range of operating pressure may be from approximately 30 psia to approximately 100 psia. It will be understood that one could operate auxiliary condenser at pressures greater than 100 psia but it is contemplated that in a practical implementation it would not be necessary to operate above 100 psia.

In operation, auxiliary condenser 24 functions essentially in the same manner as any air-cooled condenser, except that steam is condensed at a higher pressure than in ACC 22. This thermal property reduces the required enthalpy drop across the condensing device, and consequently improves the heat rejection capability. Operating the auxiliary condenser at a relatively higher saturation pressure also increases the available temperature difference ($T_{saturated}-T_{ambient}$), thus improving heat transfer.

Figure 1:
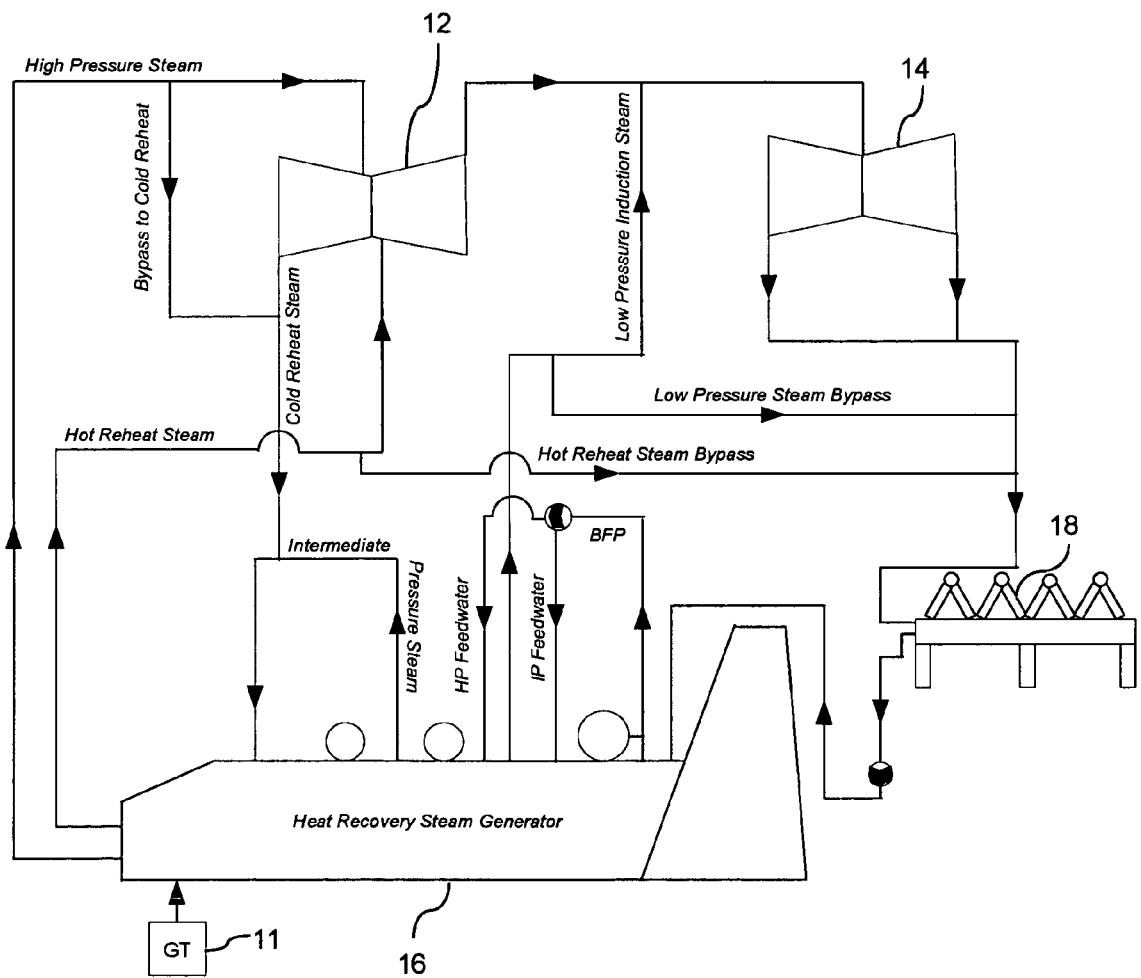
FIG. 1 a simplified schematic of an exemplary combined cycle power plant that may benefit from aspects of the present invention.
Figure 2:
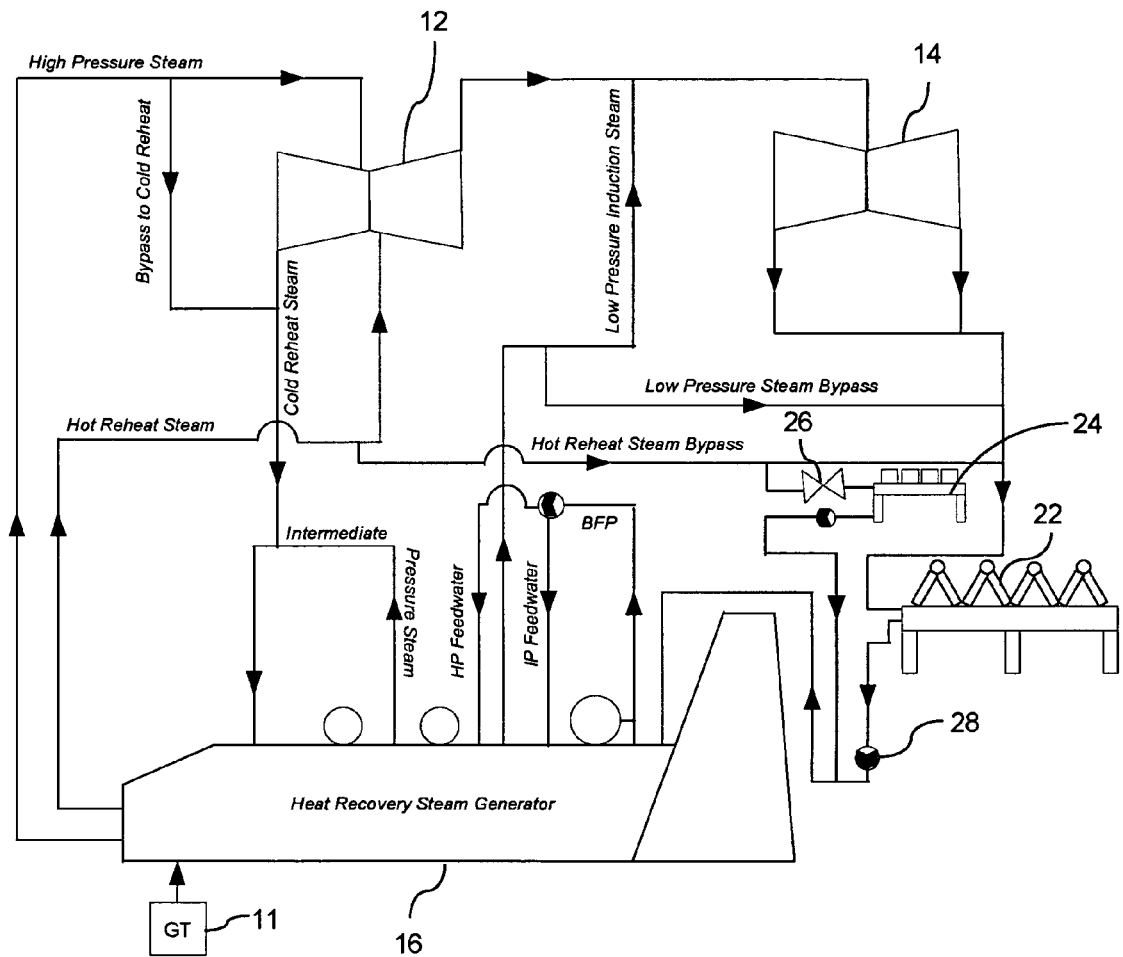
FIG. 2 is a schematic of an exemplary combined cycle power plant that comprises condensing apparatus embodying aspects of the present invention.

As shown in FIG. 2, the auxiliary condenser 24 may be connected within the plant hot reheat bypass system to be selectively connected in parallel with ACC 22. That is, auxiliary condenser 24 may be selectively connected in parallel with ACC 22 based on the heat transfer demands. For example, during a steam turbine bypass operation, a valve 26 may be initially in a closed condition and this allows steam flow to bypass auxiliary condenser 24 and enter into ACC 22 until a maximum allowable steam turbine exhaust pressure (e.g., a predefined steam turbine exhaust pressure) for steam turbine startup is reached.

Upon reaching such maximum allowable steam turbine exhaust pressure, valve 26 may be switched to an open condition and this allows for auxiliary condenser 24 to be in parallel circuit flow with ACC 22. As a result, relatively low steam turbine exhaust pressure can be maintained during steam turbine startup, with the relatively inexpensive auxiliary condenser 24 handling the additional heat rejection load produced during steam turbine startup.

As shown in FIG. 2, a condensate pump 28 is connected to ACC 22 to receive the relatively low-pressure condensate from ACC 22 and to pressurize such condensate to be fed back to the heat recovery steam generator 16. As further shown in FIG. 2, condensate from auxiliary condenser 24 is connected downstream relative to condensate pump 28. This allows relatively high-pressure condensate from auxiliary condenser 24 to be directed to the heat recovery steam generator 16 and avoids the possibility of condensate backflow into ACC 22. Furthermore, by connecting the outlet of the auxiliary condenser 24 to a point downstream of condensate pump 28, the improved heat rejection capability provided by auxiliary condenser 24 is achieved without affecting the operating pressure for the remainder of the plant.

It is noted that condensate from the auxiliary condenser 24 may be at a higher temperature than the condensate from ACC 22, due to the higher saturation pressure of auxiliary condenser 24. However, upon mixing of the respective condensates from ACC 22 and auxiliary condenser 24, the temperature of the combined condensates would be maintained within an acceptable level.

A preliminary economic evaluation of plant startup requirements and the impact of adding an auxiliary condenser for a 1×1 combined cycle plant indicates a five fold savings relative to the alternative of merely increasing the size of the ACC. Thus, it is felt that the addition of an auxiliary condenser having the above-described thermal properties is a cost effective means of addressing the heat rejection requirements for air cooled plants during steam bypass operation, including plant startup and restart.

The addition of the auxiliary condenser allows accommodating in a cost-effective manner at least the following exemplary operating criteria relative to plant startup or restart.

1. At startup, the gas turbine may now be quickly ramped to a load level that allows compliance with plant emissions requirements.

2. Hot restart at a relatively higher gas turbine load is now feasible, and this allows a reduction in restart time and, for example, ensures sufficiently high steam temperatures for entering an already hot steam turbine.

3. The requirements for maximum allowable steam turbine exhaust pressure during steam turbine roll and startup can be met, even during a hot day.

4. Additional requirements, such as related to steam flow, pressure and temperature during steam turbine startup are also met.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A condenser apparatus for a combined cycle power plant, said apparatus comprising:
   a main air-cooled condenser configured to condense steam at a first operating pressure; and
   a steam bypass circuit for selectively bypassing steam around a steam turbine of the power plant, the bypass circuit having an auxiliary air-cooled condenser for passing the steam that bypasses the steam turbine, the auxiliary air-cooled condenser coupled to the main air-cooled condenser, said auxiliary condenser configured to condense steam at a second operating pressure higher than said first operating pressure.

2. The condenser apparatus of claim 1 wherein said auxiliary condenser is coupled in parallel flow to said main condenser.

3. The condenser apparatus of claim 1 further comprising a valve for selectively coupling said auxiliary condenser to the main air-cooled condenser.

4. The condenser apparatus of claim 1 wherein said first operating pressure is below one atmosphere of pressure, and said second operating pressure is at least one atmosphere of pressure.

5. The condenser apparatus of claim 1 further comprising a condensate pump connected to pressurize condensate from the main condenser, the auxiliary condenser connected to supply condensate downstream relative to the condensate pump.

6. The condenser apparatus of claim 1 wherein an operating pressure for said main air-cooled condenser ranges from approximately 0.5 psia to approximately 5.0 psia.

7. The condenser apparatus of claim 1 wherein an operating pressure for said auxiliary air-cooled condenser ranges from approximately 30 psia to approximately 100 psia or higher.

8. A combined cycle power plant comprising:
   a gas turbine;
   a heat-recovery steam generator receiving condensate and exhaust fluid from the gas turbine for producing steam;
   a steam turbine selectively receiving the steam from the heat-recovery steam generator;
   a main air-cooled condenser receiving the steam from the steam turbine and producing condensate;
   a condensate pump for returning the condensate to the heat-recovery steam generator; and a steam bypass circuit for selectively bypassing steam around the steam turbine, the steam bypass circuit having an auxiliary air-cooled condenser for passing the steam that bypasses the steam turbine, the auxiliary air-cooled condenser connected in parallel to the main air-cooled condenser and configured to operate at a pressure higher than an operating pressure of the main air-cooled condenser.

* * * * *